US012799559B2

(12) United States Patent
Aksenova et al.

(10) Patent No.: US 12,799,559 B2
(45) Date of Patent: Nov. 17, 2026

(54) RARE EARTH ELEMENT EXTRACTION AND RECYCLING

(71) Applicant: Pioneer Astronautics, Lakewood, CO (US)

(72) Inventors: Diana Aksenova, Lakewood, CO (US); Steven Fatur, Boulder, CO (US); Alex Román, Golden, CO (US); Mark Berggren, Lakewood, CO (US); Robert Zubrin, Lakewood, CO (US)

(73) Assignee: Voyager Technologies, Inc., Denver, CO (US)

( * ) Notice: Subject to any disclaimer, the term of this patent is extended or adjusted under 35 U.S.C. 154(b) by 1274 days.

(21) Appl. No.: 17/703,339

(22) Filed: Mar. 24, 2022

(65) Prior Publication Data

US 2022/0307105 A1 Sep. 29, 2022

Related U.S. Application Data

(60) Provisional application No. 63/165,458, filed on Mar. 24, 2021.

(51) Int. Cl.
*C22B 3/12* (2006.01)
*C22B 3/22* (2006.01)
(Continued)

(52) U.S. Cl.
CPC .................. *C22B 3/12* (2013.01); *C22B 3/22* (2013.01); *C22B 59/00* (2013.01); *H01F 1/053* (2013.01); *H01F 7/02* (2013.01)

(58) Field of Classification Search
CPC .............. C22B 3/12; C22B 3/22; C22B 59/00
See application file for complete search history.

(56) References Cited

U.S. PATENT DOCUMENTS 3,018,163 A 1/1962 May et al.
2018/0171434 A1* 6/2018 Berggren ................ C22B 1/005

FOREIGN PATENT DOCUMENTS

JP 2982829 11/1999

OTHER PUBLICATIONS

Asselin (2011) "Thermochemistry of the Fe, Ni, and Co—NH3—H2O systems as the relate to the Caron process: a review" Minerals and Metallurgical Processing 28(4): 169-175.

(Continued)

*Primary Examiner* — James A Fiorito
(74) *Attorney, Agent, or Firm* — FisherBroyles, LLP; Cara L. Crowley-Weber; Gregory T. Fettig

(57) ABSTRACT

Systems and methods for recovering neodymium and other related rare earth elements from permanent magnets and/or various ore compositions are presented herein. In one embodiment, a method of recovering a rare earth element (REE) from a permanent magnet material and/or a mined ore composition (collectively "work material") is presented. The method includes converting the work material to a higher surface area form, treating the converted work material with an aqueous solution of alkaline carbonates to dissolve the REE, filtering the treated and converted work material to yield a filtrate, and treating the filtrate with at least one of a precipitating agent or a precipitating condition to form REE solids. The aqueous solution of alkaline carbonates comprises at least one of potassium carbonate, potassium bicarbonate, or dissolved carbon dioxide.

22 Claims, 5 Drawing Sheets

(51) Int. Cl.
*C22B 59/00* (2006.01)
*H01F 1/053* (2006.01)
*H01F 7/02* (2006.01)

(56) References Cited

OTHER PUBLICATIONS

Baba et al. (2013) "Rare-earth Magnet Recycling" Hitachi Review 62(8):452-455.
Binnemans et al. (2013) "Recycling of rare earths: a critical review" Journal of Cleaner Production 51:1-22.
De Vasconcellos et al. (2008) "Solubility behavior of rare earths with ammonium carbonate and ammonium carbonate plus ammonium hydroxide: Precipitation of their peroxicarbonates" Journal of Alloys and Compounds 451:42-428.
Gupta (2003) Chemical Metallurgy: Principles and Practice, Chapter 5: Hydrometallurgy, Wiley-VCH, Verlag GmbH & Co. KGaA, Weinheim.
Long et al. (2010) "The Principal Rare Earth Elements Deposits of the United States—A Summary of Domestic Deposits and a Global Perspective", U.S. Geological Survey Scientific Investigations Report 2010-5220, U.S. Department of the Interior.
Lyman and Palmer (1993) "Recycling of Neodymium Iron Boron Magnet Scrap" U.S. Bureau of Mines Report of Investigations 9481, U.S. Department of Interior.
Radmehr et al. (2012) "Ammonia Leaching in the Copper Industry: A Review", Paper No. 487, OOVI International Mineral Processing Congress IMPC), 2012 Proceedings, New Delhi, India, Sep. 26, 2012.
Sprecher et al. (2014) "Recycling Potential of Neodymium: The Case of Computer Hard Drives", Environmental Science and Technology 48:95069513.
Takeda et al. (2006) "Recovery of neodymium from a mixture of magnet scrap and other scrap", Journal of Alloys and Compounds 408-412 pp. 387-390.
Walton et al. (2015) "The use of hydrogen to separate and recycle neodymium-iron-boron-type magnets from electronic waste" Journal of Cleaner Production 104:236-241.

* cited by examiner

RARE EARTH ELEMENT EXTRACTION AND RECYCLING

CROSS REFERENCE TO RELATED APPLICATIONS

This patent application claims the benefit of U.S. Provisional Patent Application No. 63/165,458 (entitled "Rare Earth Element Extraction and Recycling" and filed on Mar. 24, 2021), the contents of which are hereby incorporated by reference.

GOVERNMENT SUPPORT STATEMENT

This invention was made with government support under U.S. Department of Energy contract no. DE-SC0020853. The government has certain rights in this invention.

BACKGROUND

Many products contain rare earth elements (REEs), such as permanent magnets, cell phones, hearing aids, wind turbines, industrial motors and generators, and catalytic converters. There is very limited U.S. domestic production of these rare earth materials and therefore a risk of foreign reliance. The production of the required amounts of neodymium for magnet production from ores results in large excess production of lanthanum and cerium, resulting in a supply imbalance. Currently, only small numbers of REE magnets used in consumer, industrial, and military applications are recycled. The magnets are usually mixed with other wastes, making their recovery and reuse difficult and expensive. Consequently, an economic and clean neodymium and REE process for recovery and recycle from manufacturing and post-consumer magnet wastes will address important supply and logistics issues by allowing for domestic production while avoiding serious environmental issues associated with fresh ore extraction methods.

Less than 1 percent of rare earth elements were being recycled as of 2013. A key issue is the removal of the magnets from the hardware in which they are installed. Several organizations have addressed this issue via automation in the dismantling and recovery of magnets before they are diluted with other wastes (which renders their recovery much more difficult). For example, some methods have been developed to recover rare earth magnets from hard disk drives and air conditioner compressor motors. Hard disk drives (HDDs) are passed through a dismantling machine from which the magnet assemblies are recovered and demagnetized. The magnets are separated from the yoke and made available for direct recycling. The rare earth magnets in air conditioner compressors are recovered in a mechanical unit that opens the casing and extracts the rotor from the motor. A resonance damping system demagnetizes the magnets prior to subjecting them to a drop impact mechanism to release the valuable material for recycling.

Others have proposed and tested a hydrogen decrepitation system for recovery of HDD magnets. While generally applicable to REE magnets used in a wide range of hardware, the process was applied to HDD magnets by first sectioning and then distorting the magnets (e.g., to fracture the structure). The pre-processed magnet assemblies were then subjected to hydrogen processing at about 2 bar gauge pressure for 2 hours at room temperature. The hydrogenated alloy is demagnetized and exhibits a volume expansion that results in decrepitation into small particles that are readily released from their housings. The assemblies were rotated in a drum, which resulted in about 90 percent recovery of the decrepitated magnet material after sieving or other physical separations from the housings.

The direct recycling of NdFeB magnets into new magnets has been demonstrated to recover up to 90 percent of magnetic properties after milling and re-sintering. However, quality after re-sintering depends on the composition of the scrap, which may not be consistent and controllable as recycling grows to larger scale. Repeated direct recycling leads to performance declines for a number of reasons. For example, gradual buildup of nickel (e.g., from surface plating material) degrades performance, and gradual oxidation of neodymium leads to deterioration in sinterability and magnetic properties. Therefore, there is a need to supply fresh rare earth elements in conjunction with recycling to enable the manufacture of high-performance magnets. The recovery and concentration of neodymium, praseodymium, dysprosium, and other rare earth elements from NdFeB permanent magnets would satisfy this need while taking advantage of the domestic availability of such magnets to solve a key logistical and supply issue.

Several methods have been proposed for the recovery of rare earth elements from manufacturing scrap or post-consumer magnets. Laboratory scale efforts have been carried out to recovery Nd metal from used magnets by extraction in molten magnesium at about 800° C., which forms a Mg—Nd alloy. The magnesium is fumed, leaving the Nd behind and resulting in a product containing about 98 percent Nd. This process is advantageous in that it keeps most of the Nd in metallic form, but it presents significant difficulties in high-temperature handling and separation of solid residues from the molten metal. Such pyrometallurgical methods (e.g., including direct smelting) are not suitable for oxidized REE materials, and they exhibit high energy consumption.

Other efforts to retrieve REEs have not been successful due to the relatively small size of the REE magnets used in some applications, such as computer hard drives. Complete dissolution of material in sulfuric acid followed by selective precipitation of various components can work. However, the sulfuric acid leaching process requires significant non-regenerable consumables and expensive materials of construction to hold up to the corrosive operating conditions. Similar problems including large chemical consumption and wastewater generation are associated with other hydrometallurgical methods. Gas phase extraction methods avoid the generation of wastewater but require large amounts of toxic and corrosive gas, such as chlorine.

SUMMARY

Systems and methods herein provide for an economically viable process for recovering rare earth materials from an abundance of waste materials. These systems and methods provide excellent economic value and serve an unmet and long felt environmental need. For example, one method includes, among other things: converting the magnet material to a higher surface area form (e.g., a powder); treating the mixture with an aqueous alkaline carbonate/bicarbonate solution to form a slurry; exposing the slurry to an oxidant to oxidize metallic constituents, and to precipitate iron and/or other base metal compounds; filtering the slurry to remove precipitated compounds; exposing the filtrate to carbon dioxide to precipitate rare earth compounds; filtering the slurry to recover precipitated rare earth compounds; and calcining the solid material to produce a rare earth oxide product. The extraction solution, depleted of rare earth elements and iron, can be reused to extract more rare earth elements from additional rare earth containing material. Reagents herein may also be recycled.

In one embodiment, a method of recovering a rare earth element (REE) from a permanent magnet material and/or a mined ore composition (collectively "work material") is presented. The method includes converting the work material to a higher surface area form, treating the converted work material with an aqueous solution of alkaline carbonates to dissolve the REE, filtering the treated and converted work material to yield a filtrate, and treating the filtrate with at least one of a precipitating agent or a precipitating condition to form REE solids. The aqueous solution of alkaline carbonates comprises at least one of potassium carbonate, potassium bicarbonate, or dissolved carbon dioxide.

The work material may include at least partially oxidized neodymium, iron, and boron. The work material may be derived from magnet manufacturing waste, mined (e.g., from terrestrial deposits or from those on an asteroid, a moon, planet Mars, or another planet), etc. Converting the work material to a higher surface area form may include performing a hydrogen decrepitation of the work material and/or grinding or milling the work material to form a powder of at least neodymium.

The method may also include heating the work material to temperatures up to 1500° C. in at least one of air, oxygen, inert atmosphere, or hydrogen. The method may also include demagnetizing the work material using an externally applied magnetic field or a mechanical shock treatment. The method may also include adjusting an oxidation state of the work material with a chemical oxidant, a chemical reductant, or via an electrochemical method that employs an electric current to transfer electrons between materials.

In some embodiments, the aqueous solution of alkaline carbonates comprises at least one of potassium carbonate, potassium bicarbonate, or dissolved carbon dioxide. The method may also include recycling the aqueous solution of alkaline carbonates. The method may also include leaching the work material with an aqueous potassium carbonate and potassium bicarbonate solution and recovering the potassium carbonate and the potassium bicarbonate via at least one of water washing precipitated solids or carbon dioxide sparging of the precipitated solids. The method may also include thermally treating a potassium bicarbonate in a leach solution to convert the potassium bicarbonate into potassium carbonate, water, and carbon dioxide at pressures above 1 bar and temperatures above 100° C.

In some embodiments, the method also includes dissolving REEs with a saturated potassium carbonate and a potassium bicarbonate solution. The method may also include leaching the work material with a concentration of potassium carbonate and potassium bicarbonate in an aqueous leaching solution that is between 1% and saturated. The method may also include treating the converted work material with the aqueous solution of alkaline carbonates along with adding oxygen, air, hydrogen peroxide, or a chemical oxidant. Treating the converted work material with the aqueous solution of alkaline carbonates may further comprise adding hydrogen peroxide or another chemical oxidant. In some embodiments, the method includes applying an electrical potential to a slurry containing alkaline carbonates and the permanent magnet material to increase a dissolution rate.

The method may also include recovering a precipitate after filtering as a byproduct containing iron and other elements. The method may also include heating the aqueous solution of alkaline carbonates to a temperature between room temperature and 100° C., to a temperature below 60° C., to a temperature between 0° C. and 100° C., and/or to a temperature above 100° C.

The method may also include treating the converted work material at a pressure above 1 bar. One or more of said converting, treating the converted work material, filtering, and treating the filtrate are performed in a container constructed of at least one of stainless steel, glass, polytetrafluoroethylene, fiberglass-reinforced plastic, corrosion resistant alloy, or a corrosion barrier. In some embodiments, the precipitating agent comprises at least one of carbon dioxide, an acid, a base, an oxidant, an oxalic acid, or a reductant. The precipitating condition comprises at least one of heat, steam, evaporation, or a vacuum.

The method may also include forming an insoluble compound with one of the rare earth elements via the precipitating agent. In some embodiments, the aqueous solution of alkaline carbonates may include iron, and the method may include plating the iron onto an electrode with an applied voltage to recover the iron. The method may also include extracting the REE solids with an extraction solution in a continuous loop. The method may also include isolating at least one of dysprosium, praseodymium, or other rare earth elements with neodymium. The method may also include heating the aqueous solution of alkaline carbonates above 100° C. in a sealed vessel to provide higher gas partial pressures while increasing the solution boiling temperature. The method may also include heating a sealed container holding an extraction mixture to produce a pressure in excess of atmospheric pressure to provide higher gas partial pressures, to increase a solution boiling temperature, and to precipitate REE oxides or carbonates.

DETAILED DESCRIPTION

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention and are to be construed as being without limitation to such specifically recited examples and conditions. As a result, the invention is not limited to the specific embodiments or examples described below.

Exemplary Rare Earth Element Extraction and Recycling (REEER) processes are disclosed herein and are operable to recover rare earth elements from compositions comprising other metals and/or metal oxides, such as permanent magnets.

Figure 1:
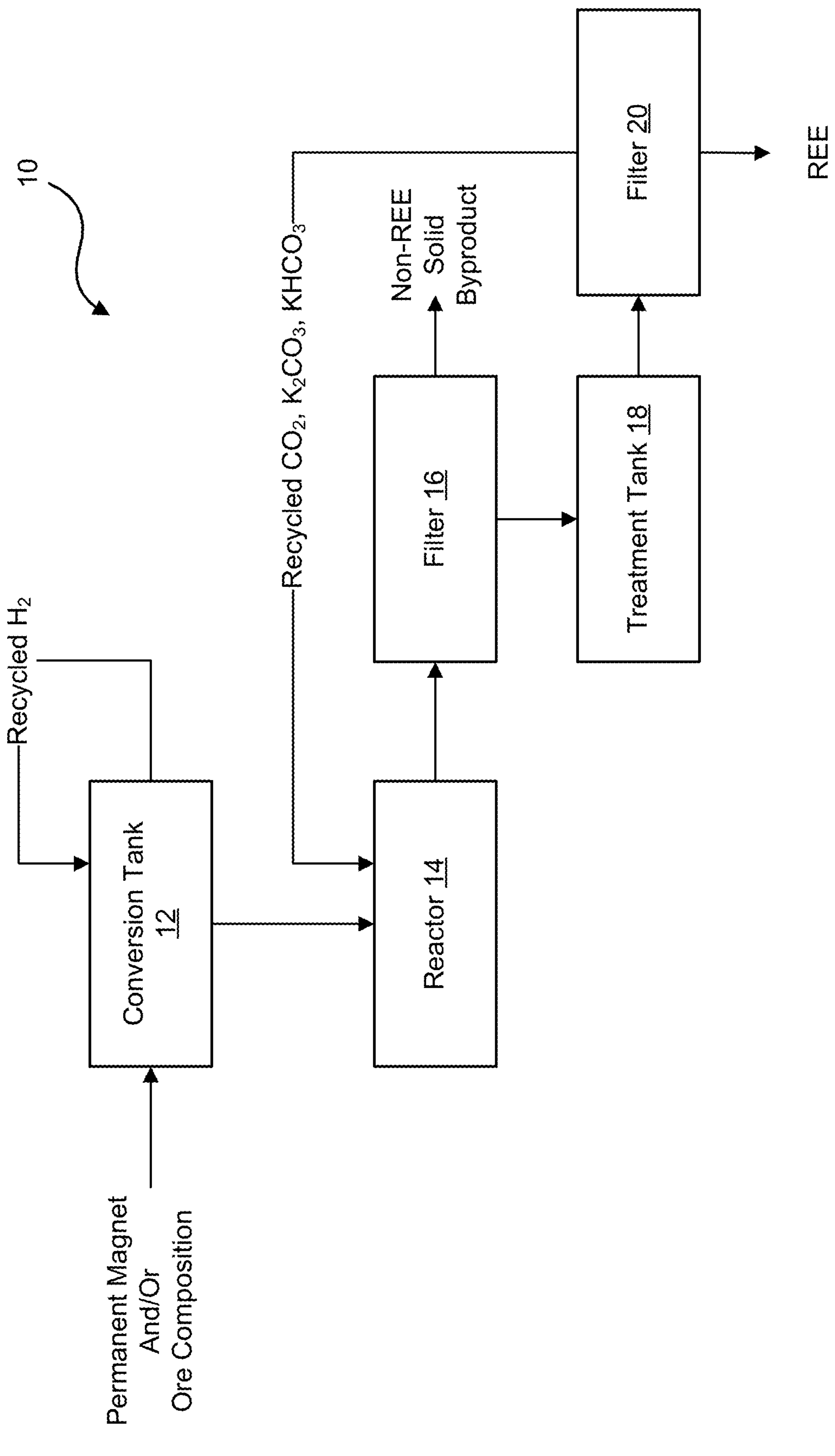
FIG. 1 is a block diagram of a system for providing rare earth element (REE) extraction, in one exemplary embodiment.

FIG. 1 is a block diagram of an exemplary system 10 for extracting rare earth elements (REEs) from permanent magnets (e.g., comprising neodymium and/or other materials) and/or ore compositions (e.g., mined ore material comprising REEs), in one exemplary embodiment. The permanent magnet material and/or the ore composition, which may be collectively referred to herein as "work material", is input to the conversion tank 12 where the work material is converted into a higher surface area form, such as a powder. In some embodiments, this may include employing a hydrogen decrepitation and/or a grinding of the work material. In the embodiments employing hydrogen decrepitation, the system 10 comprises a loop that is operable to recycle the $H_2$ being used in the process.

After the work material is converted to the higher surface area form, the work material is transferred to a reactor 14 which is operable to dissolve the REEs in the work material and form non-REE solids. For example, the reactor 14 may treat a powdered form of the work material with an aqueous solution of alkaline carbonates to dissolve the REEs and ultimately form the non-REE solids. The non-REE solids may then be filtered by a filter 16 to form a filtrate, which may then be transferred to a treatment tank 18. The filtrate may include dissolved REE carbonates.

Once the filtrate containing the REE solids is transferred to the treatment tank 18, the treatment tank 18 may treat the filtrate with a precipitating agent or a precipitating condition to form solid REE carbonates. After filtration by a filter 20 to separate solid REE carbonates from the filtrate, the solid REE carbonates can be calcined to form a REE oxide product. In some embodiments, the filtrate resulting from treatment tank 18 is also operable to recycle various materials that may be also used in the process (e.g., $CO_2$ and $H_2O$).

Figure 2:
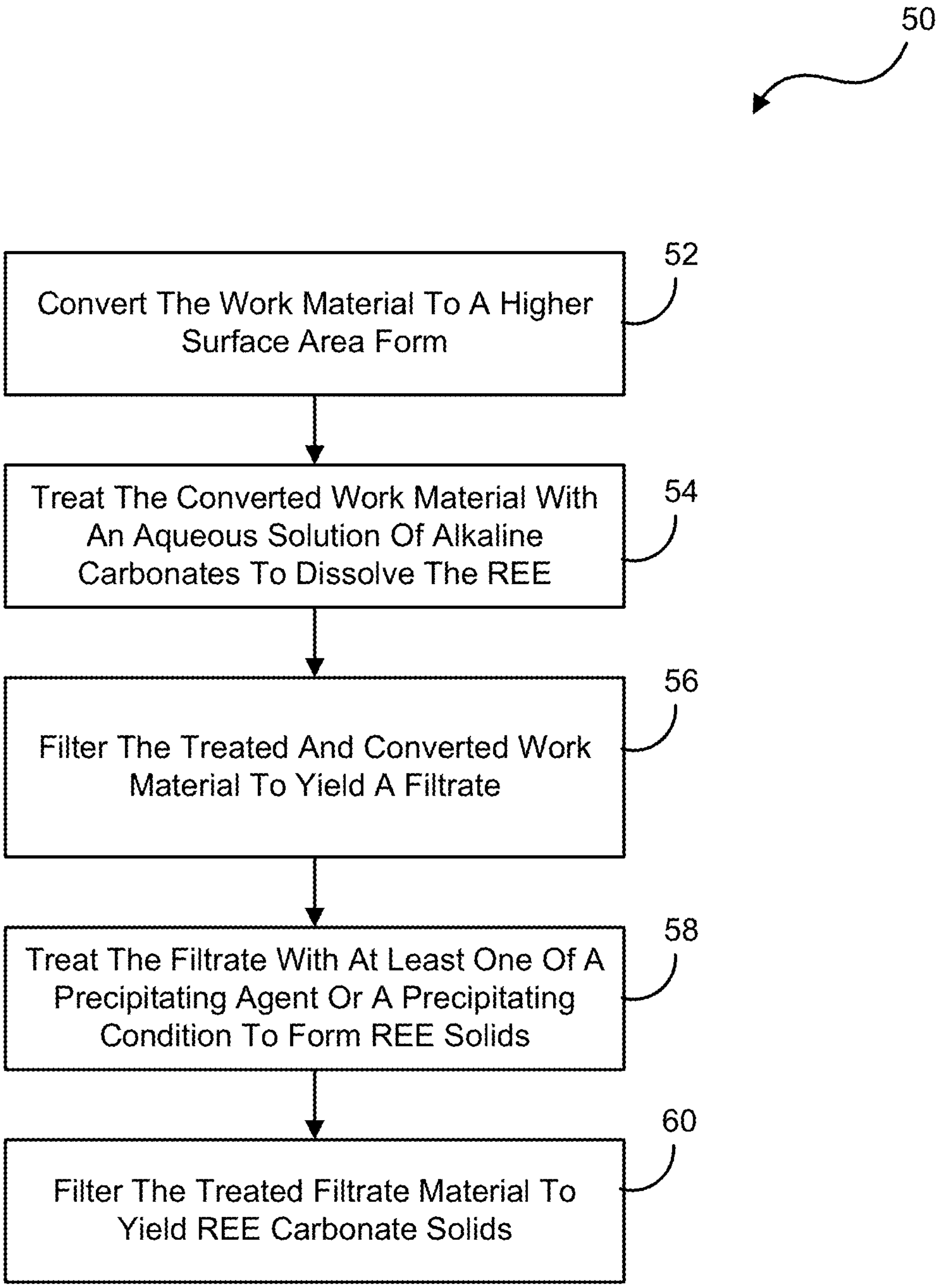
FIG. 2 is a flowchart of an exemplary process of the system of FIG. 1.

FIG. 2 is a flowchart of an exemplary process 50 of the system 10 of FIG. 1. In this embodiment, the conversion tank 12 converts the work material into a higher surface area form, such as a powder, in the process element 52. The reactor 14 then treats the converted work material with an aqueous solution of alkaline carbonates to dissolve the REE, in the process element 54. Then, the filter 16 filters the treated and converted work material to yield a filtrate, in the process element 56. Then, the treatment tank 18 treats the filtrate with at least one of a precipitating agent or a precipitating condition to form REE solids, in the process element 58. The REE solids are recovered by filtration to yield REE carbonate solids, in the process element 60. In some embodiments, the filtrate may be operable to employ a closed-loop recycling system, which recycles $CO_2$, $K_2CO_3$, and $KHCO_3$ back to the reactor 14.

Based on the foregoing, the system 10 is any device, system, software, or combination thereof operable to convert a work material into a higher surface area form such that the work material may be treated to extract REE solids for reuse. Other exemplary embodiments are shown and described below.

Figure 3:
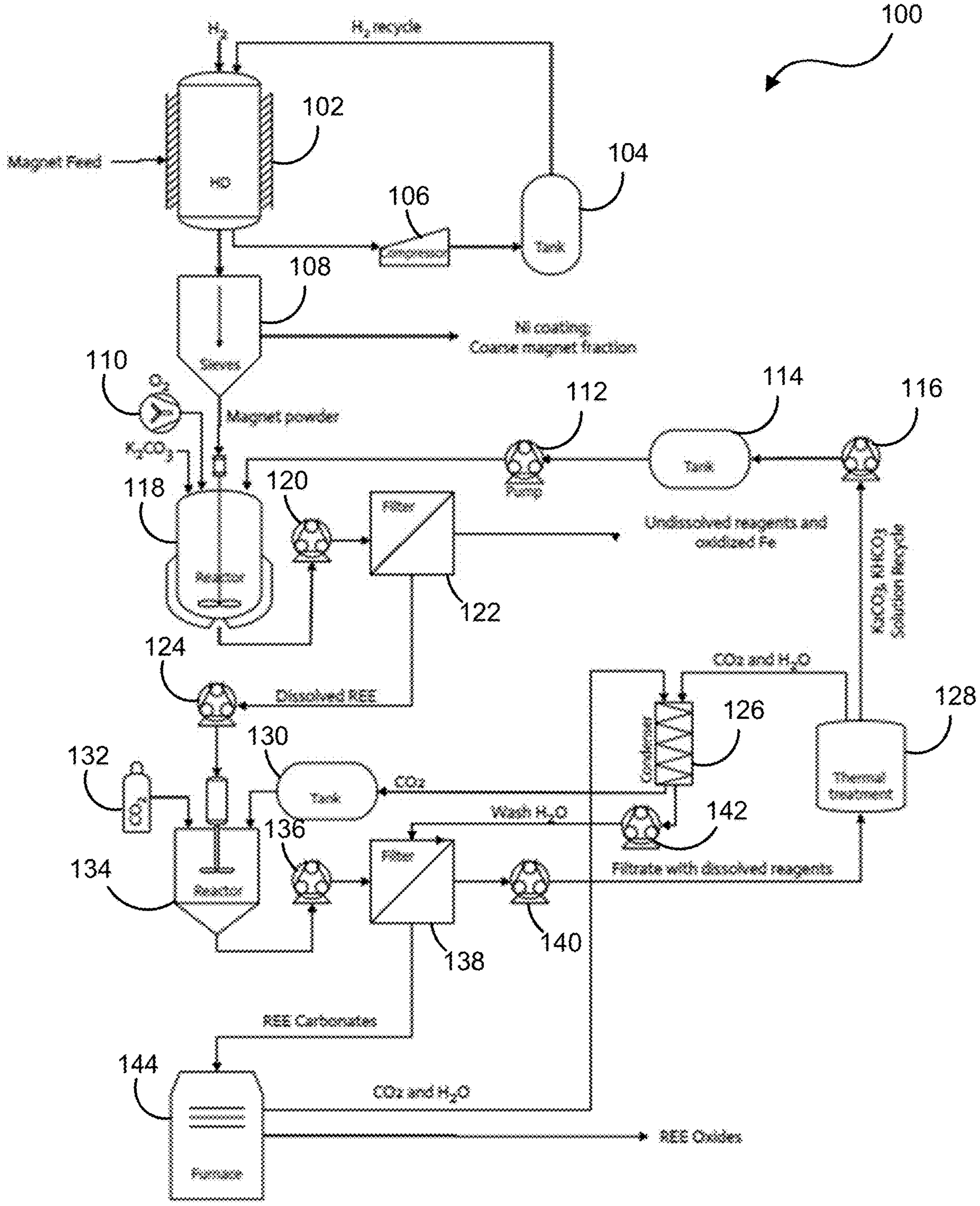
FIG. 3 is a block diagram of an exemplary Rare Earth Element Extraction and Recycling (REEER) system for the recovery of rare earth oxides from permanent rare earth magnets.

FIG. 3 is a block diagram of an exemplary Rare Earth Element Extraction and Recycling (REEER) system 100 for the recovery of rare earth oxides from permanent rare earth magnets, such as those comprising neodymium. In this embodiment, a permanent magnet material is fed into a conversion tank 102 and is treated with $H_2$ as part of a hydrogen decrepitation process that converts the magnet material into a powder, which is then filtered by a sieve 108. Alternatively or additionally, the magnet material may be ground or milled. In the embodiments in which hydrogen decrepitation is used, the system 100 may employ a compressor 106 and a tank 104 to recycle the $H_2$ being used in the process.

The sieve 108 allows for the finer powdered particles of the permanent magnet material (e.g., the REEs such as neodymium) to pass to a reactor 118. The portions of the material not passing to the reactor 118, are output as waste and/or other recyclable materials. For example, some permanent magnets are coated with various material such as plastic, nickel, copper etc. so as to prevent oxidation of the REE of the permanent magnets. Materials such as nickel and copper may have some subsequent value and/or use. Accordingly, the system 100 may retain these various materials as a matter of design choice.

Once in the reactor 118, the finer powdered particles of the permanent magnet material may be treated with $O_2$ via a pump 110, $K_2CO_3$, and $KHCO_3$, which dissolves the REEs from the finer powdered particles of the permanent magnet material. Then, the material from the reactor 118 is pumped via a pump 120 to a filter 122. The filter 122 outputs any undissolved reagents and oxidized iron. In some embodiments, the oxidized iron may be recycled by plating the iron onto an electrode (e.g., as part of an electroplating process).

The dissolved REEs are then pumped into another reactor 134 via a pump 124. The reactor 134 treats the dissolved REEs with $CO_2$ from a $CO_2$ canister 132 and/or as part of a $CO_2$ recycling process which retains the $CO_2$ in a tank 130. The treated REEs from the reactor 134 are then pumped to a filter 138 via a pump 136. The filter 138 extracts REE carbonates and transfers the remaining material to a thermal treatment container 128 via a pump 140. In doing so, the filter 138 may wash the REE carbonates with $H_2O$ via a pump 142.

The remaining material is transferred to the thermal treatment container 128 as part of a recycling process in which the filtrate with dissolved reagents are thermally treated in the thermal treatment container 128. From there, $K_2CO_3$ and $KHCO_3$ may be extracted and pumped to a storage tank 114 via a pump 116. Thus, these materials may be reused by the reactor 118 to treat the finer powdered particles of the permanent magnet material when desired. In this regard, a pump 112 may pump these materials from the tank 114 into the reactor 118 when needed.

The thermal treatment container 128 may also produce reusable $CO_2$ and $H_2O$. In this regard, the thermal treatment container 128 may transfer the $CO_2$ and $H_2O$ to a condenser 126. The $H_2O$ may be pumped to the filter 138 via the pump 142, and the $CO_2$ may be transferred to a storage tank 130 for use in the reactor 134.

As mentioned, the filter 138 extracts the REE carbonates. The filter 138 transfers the REE carbonates to a furnace 144, which thermally treats the REE carbonates to extract REE oxides. And, any resultant $CO_2$ and $H_2O$ may be passed to the condenser 126 for reuse as described above.

While this embodiment illustrates one exemplary process for extracting REEs from a permanent magnet material feed, the embodiment is not intended to be limited to simply permanent magnet materials such as those that would comprise neodymium. For example, the system 10 may be operable to extract REEs from various forms of ore materials that have been mined, as discussed above. Additionally, the processing and extraction of REEs are not intended to be limited to materials mined or manufactured on earth. Rather, the REEs may be extracted from ore material mined from various planets, moons, asteroids, and the like.

EXPERIMENTAL

Although the following exemplary experimental procedures are described in detail, they are intended to be illustrative and non-limiting. Magnets used in these experiments were found to contain 64.4% iron, 23.9% neodymium, 7.4% praseodymium, 1.4% gadolinium, 1.0% cobalt, 0.8% dysprosium, 0.4% aluminum, 0.3% copper, and 0.1% silicon by mass. Prior to leaching experiments, the magnets were cut in half and held at 200° C. for four hours in a hydrogen atmosphere at 140 PSIG. This hydrogen decrepitation step converted the magnet structure into a fine powder and the protective coating was separated from the magnet powder by coarse sieving. For experiments using oxidized starting material, the magnet powder produced via hydrogen decrepitation was oxidized by heating to 850° C. for eight hours in a muffle furnace in air. The mass of magnet powder increased by 32% in the oxidation process due to the incorporation of oxygen. Reagent samples were analyzed using x-ray fluorescence (XRF) spectroscopy to quantify their elemental composition. XRF analysis was performed using a Rigaku NEX-DE Energy-Dispersive XRF spectrometer with a silicon photodetector and a 60 kV sealed-tube source. A fundamental parameters measurement method was used for all samples to determine the elemental composition. For sample preparation, powders were placed in polypropylene sample cups or microsample cups and tamped by hand to create a packed powder prior to analysis. All values given below for dissolution, recovery, and purity are given as mass percent ($m_i/m_{total}$).

Experiment 1: General

In a borosilicate glass beaker, 5 g of magnet powder was combined with 50 mL of 3M potassium carbonate ($K_2CO_3$) and 3M potassium bicarbonate ($KHCO_3$) solution (100 g/L magnet powder) at 90° C., at atmospheric pressure, and with constant oxygen bubbling at a flow rate of 0.6 L/min for 3 hours. The slurry's total volume was held constant throughout the experiment by periodic additions of distilled water to replace water lost through evaporation. The beaker was stirred constantly using a magnetic stir bar to ensure homogeneity of the slurry. After the 3 hours elapsed, the slurry was filtered using 2.5 μm filter paper and a vacuum filtration system. The obtained solids were washed with 50 mL of distilled water and combined with the filtrate to provide 100 mL of REE-rich solution. Next, this solution was sparged with $CO_2$ to drop the pH and subsequentially precipitate rare earth carbonates and $K_2CO_3$ or $KHCO_3$. This mixture was filtered as described above and the REE-rich cake was washed with distilled water to remove potassium compounds and calcined at 850° C. to convert rare earth carbonates into the final rare earth oxide (REO) product. 90.6% of the initial REEs were leached and 75.9% of the initial REEs were recovered in the final product which was 99.2% REOs.

Experiment 2: Recycled Leach Solution

A leaching experiment was performed as in Experiment 1, but with a concentration of 50 g/L of magnet powder to start. After the REE carbonates were removed via filtration, 50 mL of the filtrate was recovered, and its pH was raised to between 10.7-11 by additions of 3M $K_2CO_3$. The resulting solution was then used in a subsequent leaching experiment with the same methodology using 2.5 g of magnet powder. This recovery and recycling method was performed four times to generate four REE oxide products with the following analyses: A. (fresh solution) 95.9% of the initial REEs were leached and 50.0% of the initial REEs were recovered in the final product, which was 95.1% REOs; B. ($1^{st}$ recycle) 90.5% of the initial REEs were leached and 82.5% of the initial REEs were recovered in the final product, which was 98.4% REOs; C. ($2^{nd}$ recycle) 96.8% of the initial REEs were leached and 75.5% of the initial REEs were recovered in the final product, which was 96.5% REOs; D. ($3^{rd}$ recycle) 94.1% of the initial REEs were leached and 100% of the initial REEs were recovered in the final product, which was 96.4% REOs.

Experiment 3

In a borosilicate glass beaker, 3.3 g of oxidized magnet powder was combined with 50 mL of 3M $K_2CO_3$ and 3M $KHCO_3$ solution at 90° C. and atmospheric pressure for 3 hours. The total volume of the slurry was held constant throughout the experiment by periodic additions of distilled water to replace water lost through evaporation. The beaker was stirred constantly using a magnetic stir bar to ensure homogeneity of the slurry. After the 3 hours elapsed, the slurry was filtered using 2.5 μm filter paper and a vacuum filtration system. The obtained solids were washed with 50 mL of distilled water and combined with the filtrate to provide 100 mL of REE-rich solution. Next, this solution was sparged with $CO_2$ to drop the pH to 8.3 and subsequentially precipitate rare earth carbonates and $K_2CO_3$ or $KHCO_3$. This mixture was filtered as described above and the REE-rich cake was washed with distilled water to remove potassium compounds and calcined at 850° C. to convert carbonates into the final oxide product. 36.5% of the initial REEs were leached and 14.0% of the initial REEs were recovered in the final product, which was 99.4% REOs.

Experiment 4

A leaching experiment was performed as described in Experiment 1, but with a concentration of 50 g/L of magnet powder and a leaching solution composed 3M $K_2CO_3$ with no addition of $KHCO_3$ (potassium bicarbonate). 43% of the initial REEs were leached and 20% of the initial REEs were recovered in the final product, which was 97% REOs.

Experiment 5

A leaching experiment was conducted in a sealed, polytetrafluoroethylene (PTFE)-lined stainless-steel reactor with walls heated to 90° C. using an electrical resistance heating element. 2.5 g of magnet powder was combined with 50 mL of 3M $K_2CO_3$ and 3M $KHCO_3$ solution (50 g/L magnet powder) in an oxygen atmosphere with the pressure held at 20 PSIG for three hours. The slurry was then filtered and washed as described in Experiment 1 to yield 100 mL of an REE-rich solution. The solution was returned to the reactor, sealed, and sparged with $CO_2$ from a 50 PSIG inlet source with the internal pressure held at 20 PSIG and constant venting of the excess pressure for three hours. The dynamic $CO_2$ atmosphere was found to be superior to a static $CO_2$ atmosphere in an independent experiment. After the $CO_2$ sparging, the reaction mixture was again filtered as described in Experiment 1, then the REE-rich cake was washed with distilled water to remove potassium compounds and calcined at 1000° C. to convert rare earth carbonates into the final rare earth oxide (REO) product. 95.0% of the initial REEs were leached and 94.5% of the initial REEs were recovered in the final product which was 97.2% REOs.

Experiment 6

A hydrothermal experiment was conducted in a 50 mL autoclave reactor with a PTFE liner and a pressure limit of 870 PSIA. 25 mL of a mixed 2M $K_2CO_3$ and 2M $KHCO_3$ solution was added to the autoclave reactor along with 1 g of magnet powder and 2 mL of 34% hydrogen peroxide solution ($H_2O_2$) before sealing the reactor. The sealed reactor was then placed into a muffle furnace and heated to 130° C. at a rate of 10° C./min and held at that temperature for 16 hours, resulting in an estimated pressure inside the vessel of 60 PSIA. The reactor was then allowed to cool to room temperature prior to opening the reactor. Upon opening, the reactor contents were filtered, and the filtrate was completely evaporated at 120° C. to isolate the dissolved solids as a residue. This residue was calcined at 850° C. for eight hours and washed with distilled water to remove soluble salts prior to analysis using Scanning Electron Microscopy/Energy Dispersive X-Ray Spectroscopy (SEM/EDS). 95% of the initial REEs were recovered in the final product which was 78% REOs. The concentration of dissolved REEs was estimated as 26 g/L, far in excess of what was obtained in the alternate approaches described above. Further heating is also expected to improve the reaction kinetics in accordance with the Arrhenius equation:

$$k = Ae^{\frac{-E_a}{RT}},$$

where k is the rate constant, T is the absolute temperature, A is the pre-exponential factor for the specific reaction, $E_a$ is the activation energy for the reaction, R is the universal gas constant, and e is Euler's number, a mathematical constant. Given that no leaching is observed after three hours at room temperature and otherwise identical conditions to those described in Experiment 1, higher temperatures have been demonstrated to increase the reaction rate. Generally, further heating may improve the reaction kinetics further.

Experiment 7

A leaching experiment may be conducted as described in Experiment 1 to produce a rare earth-rich filtrate following the first filtration and subsequent washing steps. At this point the 100 mL of filtrate may be split into five aliquots of 20 mL each (Aliquot A, B, C, D, and E). An oxidizing agent such as potassium dichromate may be added to Aliquot A to provide an oxidizing atmosphere, raising Eh, to precipitate a rare earth oxide. A reducing agent such as chromium (II) chloride powder may be added to Aliquot B to provide a reducing environment, lowering Eh, to precipitate a rare earth oxide or carbonate. An acid such as hydrochloric acid may be added to Aliquot C, lowering the pH, and precipitating the rare earth carbonate. A base such as sodium hydroxide may be added to Aliquot D, raising the pH, and precipitating the rare earth oxide or carbonate. A metathesis reaction may be performed on Aliquot E by adding a reagent such as sodium oxalate to form an insoluble rare earth oxalate that precipitates. After filtering the mixtures produced from Aliquot A, Aliquot B, Aliquot C, Aliquot D, and Aliquot E, the solids may be heated in a furnace at 850° C. to produce a mixed rare earth oxide product with high yield.

Experiment 8

A leaching experiment could be performed as in Experiment 1, but after the REE carbonates were removed via filtration, the filtrate could be placed into a sealed vessel. The vessel could then be heated to 160° C. and held at a pressure of 60 PSIA using a pressure control device such as a pressure relief valve or a back pressure regulator. Holding the vessel at these conditions would then convert potassium bicarbonate into potassium carbonate and release water and carbon dioxide according to the net reaction:

$$2KHCO_{3(aq)} \rightarrow K_2CO_{3(aq)} + H_2O_{(g)} + CO_{2(g)}$$

Figure 4:
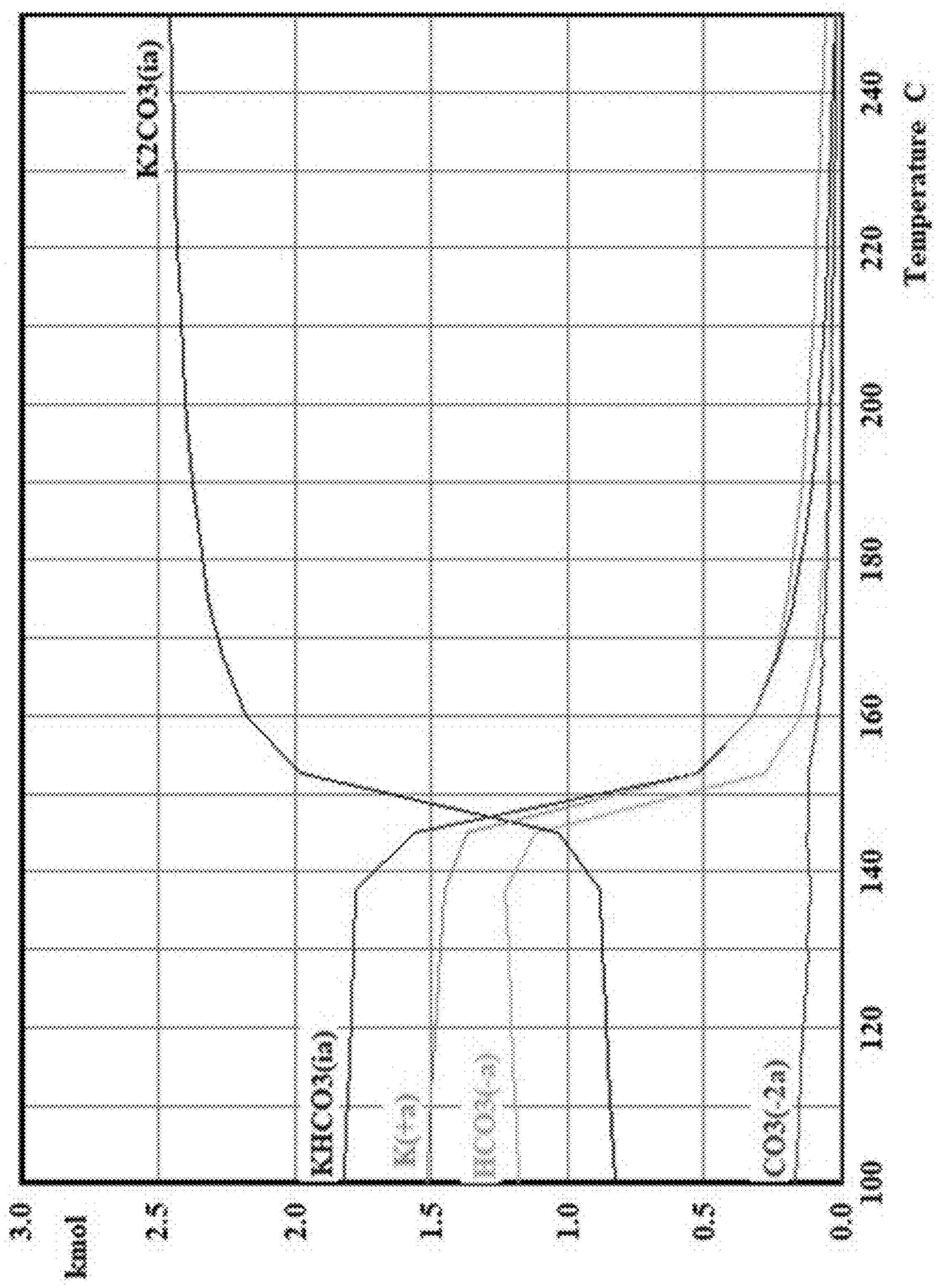
FIG. 4 is a plot of equilibrium concentrations versus temperature for a reaction system of aqueous potassium carbonate ($K_2CO_3$), potassium bicarbonate ($KHCO_3$), and their ionic constituents at a pressure of 4.0 bar.

FIG. 4 provides a plot showing the amounts of these components versus the temperature at a pressure of 4.0 bar. This plot was produced by computing the relative amounts of each species at a given temperature to demonstrate the potential application of this recycling step. Upon reaching a pH of between 10.7-11, the solution will have the same composition as the initial leach solution and could be directly reused to leach additional magnet material. The $CO_2$ and $H_2O$ released during this process could be passed through a condenser held at 10° C. to form liquid water, which could be used to wash the filtered solids or added back into the initial solution to make up for any water lost in the process. Following removal of water by the condenser, the $CO_2$ could be compressed with a compressor and stored in a tank prior to being reused to precipitate rare earth compounds from the REE-rich solution as described in Experiment 1.

Figure 5:
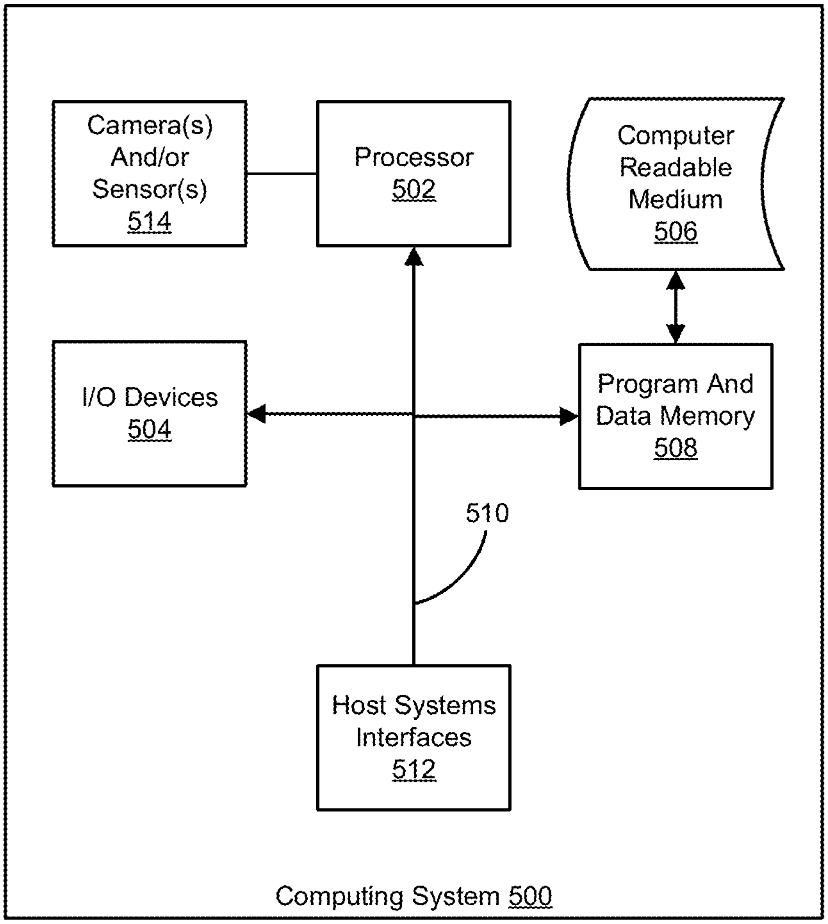
FIG. 5 is a block diagram of an exemplary computing system in which a computer readable medium provides instructions for performing methods herein.

Any of the above embodiments herein may be rearranged and/or combined with other embodiments. Accordingly, the concepts herein are not to be limited to any particular embodiment disclosed herein. Additionally, the embodiments can take the form of entirely hardware or comprising both hardware and software elements. Portions of the embodiments may be implemented in software, which includes but is not limited to firmware, resident software, microcode, etc. For example, software may be used to control various reactions, processes, and hardware (e.g., pumps, reactors, condensers, etc.) presented herein. FIG. 5 illustrates one exemplary computing system 500 in which a computer readable medium 506 may provide instructions for performing any of the methods disclosed herein.

Furthermore, the embodiments can take the form of a computer program product accessible from the computer readable medium 506 providing program code for use by or in connection with a computer or any instruction execution system. For the purposes of this description, the computer readable medium 506 can be any apparatus that can tangibly store the program for use by or in connection with the instruction execution system, apparatus, or device, including the computer system 500.

The medium 506 can be any tangible electronic, magnetic, optical, electromagnetic, infrared, or semiconductor system (or apparatus or device). Examples of a computer readable medium 506 include a semiconductor or solid state memory, magnetic tape, a removable computer diskette, a random access memory (RAM), NAND flash memory, a read-only memory (ROM), a rigid magnetic disk and an optical disk. Some examples of optical disks include compact disk-read only memory (CD-ROM), compact disk-read/write (CD-R/W) and digital versatile disc (DVD).

The computing system 500, suitable for storing and/or executing program code, can include one or more processors 502 coupled directly or indirectly to memory 508 through a system bus 510. The memory 508 can include local memory employed during actual execution of the program code, bulk storage, and cache memories which provide temporary storage of at least some program code in order to reduce the number of times code is retrieved from bulk storage during execution. Input/output or I/O devices 504 (including but not limited to keyboards, displays, pointing devices, etc.) can be coupled to the system either directly or through intervening I/O controllers. Network adapters may also be coupled to the system to enable the computing system 500 to become coupled to other data processing systems, such as through host systems interfaces 512, or remote printers or storage devices through intervening private or public networks. Modems, cable modem and Ethernet cards are just a few of the currently available types of network adapters.

Various Embodiments

In one embodiment, a REEER process recovers neodymium and related rare earth elements from metallic alloys.

In one embodiment, the REEER process recovers neodymium and related rare earth elements from partially or fully oxidized permanent magnets.

In one embodiment, the REEER process recovers rare earth elements from an ore.

In one embodiment, the REEER process recovers rare earth elements from manufacturing wastes such as cutting swarf in which oxidation of the alloy may have occurred.

In one embodiment, the REEER process recovers neodymium and related rare earth elements from permanent magnets of variable composition recycled from hard disk drives (HDD), motors, generators, and other industrial, military, and consumer products.

In one embodiment, the REEER process recovers rare earth oxides as high-quality feed stock to support manufacture of new high-performance magnets. After reduction of the rare earth oxides, they may be combined with fresh material in any proportion to alter or enhance the magnetic properties.

In one embodiment, the REEER process recovers rare earth elements from wastes derived from mining or extracting and processing other materials, such as coal, minerals, metals, fuels, or any solid-forming byproduct.

In one embodiment of the process, an initial low-temperature, low-pressure hydrogen decrepitation step is carried out to demagnetize, produce fine particles, and release surface coatings.

In another embodiment, pretreatment may include additional grinding of the brittle magnet material to open additional surface area.

In other embodiments, additional pretreatment may be applied to de-hydrogenate the decrepitated magnet material (by application of vacuum) or to adjust the oxidation state prior to extraction using chemical, electrical, or other oxidation or reduction methods.

In one embodiment of the process, pretreatment of magnet powders by exposure to air at temperatures up to 1500° C. to oxidize magnet powder prior to extraction.

In one embodiment of the process, pretreatment of magnet powders by exposure to hydrogen at temperatures up to 1500° C. to reduce iron and other oxides to metal prior to extraction.

In one embodiment of the process, pretreatment may include demagnetization of the magnetic starting material using an externally applied magnetic field or a mechanical shock treatment.

In one embodiment, a recoverable aqueous potassium carbonate/bicarbonate leach solution is used to decompose permanent magnet alloy compositions at low temperature and pressure into insoluble precipitates and soluble metal complexes.

In other embodiments, the leach solution is composed of aqueous potassium carbonate only or a combination of potassium carbonate and carbon dioxide gas.

In one embodiment, a regenerable aqueous potassium carbonate/bicarbonate solution is used to decompose permanent magnet alloy compositions at low temperature and pressure into their iron, rare earth elements, and boron constituents to enable recovery and recycling for production of new materials.

In one embodiment, after selective recovery of constituents from the mixture, the extraction solution is directly recycled, potassium hydroxide, or potassium carbonate and carbon dioxide are recovered and then recycled to the process. The novel application of an aqueous potassium/potassium carbonate extraction process avoids the costs and environmental impacts of alternate aqueous treatments using strong sulfuric, hydrochloric, nitric, or hydrofluoric acids, which all produce salts or waste byproducts that must be disposed.

In one embodiment, the extraction process is carried out in saturated potassium carbonate and potassium bicarbonate solution.

In one embodiment, the extraction process is carried out in a solution composed of 3 molar potassium carbonate and 3 molar potassium bicarbonate.

In one embodiment, the extraction process is carried out in solutions with concentrations of potassium carbonate and potassium bicarbonate between 0.1 molar and the saturation point.

In one embodiment, the extraction process is carried out in a solution of potassium carbonate with a concentration between 0.1 molar and the saturation point.

In one embodiment, oxygen gas is used as an oxidant in the leaching step.

In one embodiment, air is used as an oxidant in the leaching step.

In one embodiment, a chemical oxidant such as hydrogen peroxide as an oxidant in the leaching step.

In one embodiment, the rate of dissolution is increased by using an electrolytic approach, such as applying an electrical potential to the magnet material.

In one embodiment, the extraction process is typically carried out at temperatures below 100° C.

In one embodiment, the extraction process is typically carried out at temperatures above 100° C. and at pressure greater than 1 atmosphere.

In one embodiment, the extraction process is typically carried out at temperatures below about 60° C.

In one embodiment, the extraction process is typically carried out at temperatures between ambient and 100° C.

In one embodiment, the extraction process is typically carried out at temperatures between ambient and about 60° C.

In one embodiment, the extraction process is typically carried out at temperatures below about 60° C. and at low pressure.

In one embodiment, the extraction process is typically carried out in vessels constructed of stainless-steel without any lining.

In one embodiment, the extraction process is typically carried out in vessels composed of or lined with glass.

In one embodiment, the extraction process is typically carried out in vessels composed of or lined with polytetrafluoroethylene (PTFE).

In one embodiment, the extraction process is typically carried out in vessels composed of fiberglass-reinforced plastic.

In other embodiments, the extraction process is typically carried out in vessels composed of or lined with a corrosion barrier that does not react with the mixture.

In one embodiment of the process, $CO_2$ is added to the solution to precipitate the dissolved REEs.

In one embodiment of the process, addition of a base causes precipitation of dissolved REEs.

In one embodiment of the process, addition of an acid causes precipitation of dissolved REEs.

In one embodiment of the process, addition of either an acid or a base causes precipitation of dissolved iron.

In one embodiment of the process, $CO_2$, air, oxygen, hydrogen peroxide, etc. is used to change the $E_h$ and cause precipitation of the REEs or dissolved iron.

In one embodiment of the process, heat, steam, or evaporation is employed to cause precipitation.

In one embodiment of the process, vacuum or evaporation is employed to cause precipitation.

In one embodiment of the process, metal addition, $H_2$, CO, carbon, or other reducing agents are employed to adjust Eh to cause precipitation.

In one embodiment of the process, a reagent such as oxalic acid is added to form an insoluble REE compound.

In one embodiment of the process, iron in the solution is recovered by plating it onto an electrode using an applied voltage.

In one embodiment of the process, direct recycle of potassium carbonate and potassium bicarbonate solution is done after precipitation of solids.

In one embodiment of the process, multiple extraction stages are employed to further separate REE from iron or other contaminants.

In one embodiment of the process, additives for leaching or precipitation are recovered and reused.

In one embodiment potassium compounds are recovered from precipitated solids by washing with water.

In one embodiment of the process, after filtering to remove rare earth carbonates, the potassium carbonate and potassium bicarbonate mixture is heated to release water and $CO_2$ for reuse and to convert bicarbonates to carbonates for direct reuse.

In another embodiment of the process, after filtering to remove rare earth carbonates, the potassium carbonate and potassium bicarbonate mixture is heated to about 160° C. at a pressure of about 60 PSIA to change the balance of species in the used leach solution and generate water and $CO_2$ for reuse.

In one embodiment of the process, the process feed is obtained from asteroid, the moon, Mars, or other extraterrestrial resources.

In one embodiment of the process, precious metals are isolated by the steps of the process.

As used herein, in situ resource utilization (ISRU) is the collection, processing, storing, and use of materials encountered during human or robotic terrestrial or space exploration that replace materials that would otherwise be brought from a remote location such as another geographic location or another planet or location in space.

In some embodiments, the process employs ISRU to leverage resources found or manufactured on other astronomical objects (e.g., the moon, Mars, asteroids, etc.) to fulfill or enhance the requirements and capabilities of a space or terrestrial mission.

In other embodiments, the process is useful in recovering rare earth and precious metals from an asteroid and other extra-terrestrial sites such as the planet Mars or the moon.

In one embodiment, the process is used in asteroid mining to recover valuable rare earth metals and precious metals.

What is claimed is:

1. A method of recovering a rare earth element (REE) from a permanent magnet material, the method comprising:
- converting the permanent magnet material to a higher surface area form;
- treating the converted permanent magnet material with an aqueous solution of alkaline carbonates to dissolve the REE;
- filtering the treated and converted permanent magnet material to yield a filtrate;
- treating the filtrate with at least one of a precipitating agent or a precipitating condition to form REE solids;
- leaching the permanent magnet material with an aqueous potassium carbonate and potassium bicarbonate solution; and
- recovering the potassium carbonate and the potassium bicarbonate via at least one of water washing precipitated potassium solids or carbon dioxide sparging of the precipitated potassium solids.

2. The method of claim 1, wherein the permanent magnet material comprises at least partially oxidized neodymium, iron, and boron.

3. The method of claim 1, wherein:
- converting the permanent magnet material to a higher surface area form comprises performing a hydrogen decrepitation of the permanent magnet material to form a powder of at least neodymium.

4. The method of claim 1, wherein:
- converting the permanent magnet material to a higher surface area form comprises grinding or milling the permanent magnet material.

5. The method of claim 1, further comprising:
- heating the permanent magnet material to temperatures up to 1500° C. in at least one of air, oxygen, inert atmosphere, or hydrogen.

6. The method of claim 1, further comprising:
- demagnetizing the permanent magnet material using an externally applied magnetic field or a mechanical shock treatment.

7. The method of claim 1, further comprising:
- adjusting an oxidation state of the permanent magnet material with a chemical oxidant, a chemical reductant, or via an electrochemical method that employs an electric current to transfer electrons between materials.

8. The method of claim 1, wherein the aqueous solution of alkaline carbonates comprises at least one of potassium carbonate, potassium bicarbonate, or dissolved carbon dioxide.

9. The method of claim 1, further comprising:
- recycling the aqueous solution of alkaline carbonates.

10. The method of claim 1, further comprising:
- thermally treating a potassium bicarbonate in a leach solution to convert the potassium bicarbonate into potassium carbonate, water, and carbon dioxide at pressures above 1 bar and temperatures above 100° C.

11. The method of claim 1, wherein treating the converted permanent magnet material with the aqueous solution of alkaline carbonates further comprises adding oxygen, air, hydrogen peroxide, or a chemical oxidant.

12. The method of claim 1, further comprising:
heating the aqueous solution of alkaline carbonates to a temperature between 0° C. and 100° C. at a pressure above 1 bar.

13. The method of claim 1, wherein:
one or more of said converting, treating the converted permanent magnet material, filtering, and treating the filtrate are performed in a container constructed of at least one of stainless steel, glass, polytetrafluoroethylene, fiberglass-reinforced plastic, corrosion resistant alloy, or a corrosion barrier.

14. The method of claim 1, wherein:
the precipitating agent comprises at least one of carbon dioxide, an acid, a base, an oxidant, an oxalic acid, or a reductant.

15. The method of claim 1, wherein:
the precipitating condition comprises at least one of heat, steam, evaporation, or a vacuum.

16. The method of claim 1, further comprising:
forming an insoluble compound with one of the REEs via the precipitating agent.

17. The method of claim 1, further comprising:
extracting the REE solids with an extraction solution in a continuous loop.

18. The method of claim 1, further comprising:
isolating at least one of dysprosium, praseodymium, or other rare earth elements with neodymium.

19. The method of claim 1, further comprising:
heating the aqueous solution of alkaline carbonates above 100° C. in a sealed vessel to provide higher gas partial pressures while increasing a solution boiling temperature.

20. The method of claim 1, further comprising:
heating a sealed container holding an extraction mixture to produce a pressure in excess of atmospheric pressure to provide higher gas partial pressures, to increase a solution boiling temperature, and to precipitate REE oxides or carbonates.

21. A method of recovering a rare earth element (REE) from a permanent magnet material, the method comprising:
converting the permanent magnet material to a higher surface area form;
treating the converted permanent magnet material with an aqueous solution of alkaline carbonates to dissolve the REE;
filtering the treated and converted permanent magnet material to yield a filtrate;
treating the filtrate with at least one of a precipitating agent or a precipitating condition to form REE solids; and
dissolving and other REEs with a saturated potassium carbonate and a potassium bicarbonate solution.

22. A method of recovering a rare earth element (REE) from a permanent magnet material, the method comprising:
converting the permanent magnet material to a higher surface area form;
treating the converted permanent magnet material with an aqueous solution of alkaline carbonates to dissolve the REE;
filtering the treated and converted permanent magnet material to yield a filtrate;
treating the filtrate with at least one of a precipitating agent or a precipitating condition to form REE solids; and
leaching the permanent magnet material with a concentration of potassium carbonate and potassium bicarbonate in an aqueous leaching solution that is between 1% and saturated.

* * * * *